F. Groves.
Evaporating Pan.
No. 46,969. Patented Mar. 21, 1865.
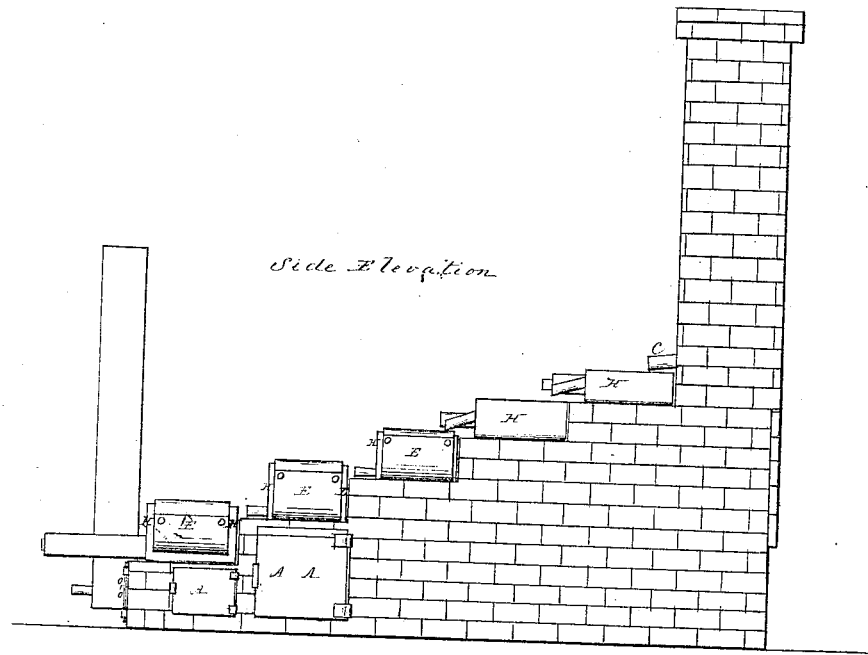
Side Elevation
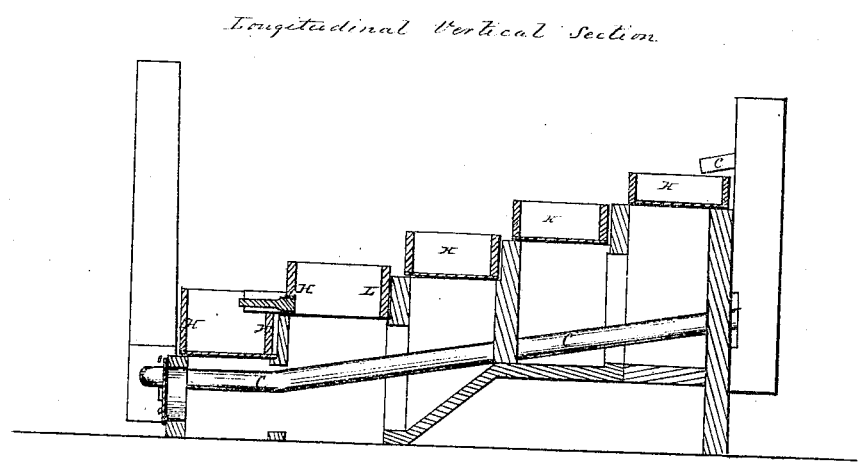
Longitudinal Vertical Section

UNITED STATES PATENT OFFICE.

F. GROVES, OF NEW OXFORD, PENNSYLVANIA, ASSIGNOR TO CHAS. A. DIEHL, OF SAME PLACE.

IMPROVED CANE-JUICE EVAPORATOR.

Specification forming part of Letters Patent No. 46,969, dated March 21, 186

*To all whom it may concern:*

Be it known that I, F. GROVES, of New Oxford, county of Adams, and State of Pennsylvania, have invented a new and Improved Mode of Sugar-Juice Evaporators; and I do hereby declare that the following is a full and exact description thereof, reference being had to the accompanying drawing and the letters referred to and marked thereon.

The nature of these evaporators is in separate pans, arranged in an elevation one above the other, so constructed to run the sugar-juice in the farthest or most elevated pan. The juice is heated by running through a wrought or cast iron pipe, C, laid through the fire-chambers, and enters pan farthest or most elevated pipe C C. Juice is admitted into pan in a boiling condition. Thereby a saving of fuel is effected, also giving the advantage. Commencing evaporation in said farthest pan thereby gives it a speedy finish, as is required in manufacturing a genuine sirup, thus working the juice from one pan to the other in batches or masses to bring it in a uniformity before entering the finishing-pan H H. Fire-chambers are so constructed to throw the heat from one pan to the other before entering the chimney. Fire-chamber door A; pan, H H, for finishing sirup; fire-door A A; pan H L, constructed for sharp fires to separate the scum or acrid matter from the liquid hastily; fire-door O O, to regulate the fire to throw the scum toward the skim-boxes E or fire-doors A and A A, to remove it with ease.

Thorough experience in the manufacture of sorghum led me to this invention and construction of evaporators herein specified and set forth.

What I claim as my invention, and desire to secure by Letters Patent, is—

1. The combination and arrangement of heating-pipe C through the furnace, with a series of pans one above the other, substantially as described.

2. The arrangement of the oblong pans H H, &c., with openings on alternate sides, so as to keep the juice flowing briskly as it is evaporated.

3. The fire-door O O in combination with doors A and A A, so as to regulate the fires and throw off the scum, as described.

F. GROVES.

Witnesses:
ABDIEL J. GITT,
DAVID PETERS.